(12) United States Patent
Rioux

(10) Patent No.: US 7,069,798 B2
(45) Date of Patent: Jul. 4, 2006

(54) PROFILING SYSTEM

(76) Inventor: Daniel Rioux, 2285 Aladin, Laval, Québec (CA) H7K 1M1

( * ) Notice: Subject to any disclaimer, the term of this patent is extended or adjusted under 35 U.S.C. 154(b) by 43 days.

(21) Appl. No.: 10/324,072

(22) Filed: Dec. 20, 2002

(65) Prior Publication Data

US 2003/0174578 A1 Sep. 18, 2003

(30) Foreign Application Priority Data

Dec. 20, 2001 (CA) .................................... 2366030

(51) Int. Cl.
 G01P 1/02 (2006.01)
 G01P 15/00 (2006.01)
 G01D 21/00 (2006.01)
 G01N 29/00 (2006.01)

(52) U.S. Cl. .................... 73/866.5; 73/493; 73/602; 702/141

(58) Field of Classification Search ............... 73/493, 73/866.5, 514.33, 514.16, 431, 514.32, 514.34, 73/584–894, 579, 602; 324/162, 166; 367/76; 702/39, 141, 189
See application file for complete search history.

(56) References Cited

U.S. PATENT DOCUMENTS

| | | |
|---|---|---|
| 3,806,795 A | 4/1974 | Morey |
| 4,006,445 A | 2/1977 | Howell |
| 4,528,649 A | 7/1985 | Gassaway et al. |
| 4,598,588 A * | 7/1986 | Hanson ....................... 73/584 |
| 4,601,022 A | 7/1986 | Muir |
| 4,765,750 A | 8/1988 | Wadley |
| 4,803,666 A | 2/1989 | Alford |
| 4,831,558 A * | 5/1989 | Shoup et al. ............... 702/188 |
| 4,835,474 A | 5/1989 | Parra et al. |
| 4,905,008 A | 2/1990 | Kawano et al. |
| 4,969,129 A | 11/1990 | Currie |

(Continued)

FOREIGN PATENT DOCUMENTS

DE 100 13 084 A1 9/2001

(Continued)

Primary Examiner—Helen Kwok
(74) Attorney, Agent, or Firm—Ogilvy Renault LLP

(57) ABSTRACT

A profiling system for obtaining a characterization of a medium under a surface. The profiling system comprising a plurality of system components exchanging messages through a communication interface. The system components comprise an energy impulse generator, a sensing assembly, and a user-computing interface. The generator, for transferring an energy pulse to the surface, comprises generator communication means for exchanging the messages with other system components. The sensing assembly includes sensors. Each one of the sensors comprises an accelerometer for detecting an acceleration on the surface resulting from the energy pulse and producing a signal representative of the acceleration. Each one of the sensors also comprises an interface communication means for transmitting the signal representative of the acceleration and exchanging messages with other system components through the communication interface. The user-computing interface comprises interface communication means for receiving the signal representative of the acceleration and exchanging messages with other system components through the communication interface. The user-computing interface also comprises an interface processor for processing the received signal representative of the acceleration to produce the characterization of the medium under the surface.

15 Claims, 6 Drawing Sheets

U.S. PATENT DOCUMENTS

| | | | |
|---|---|---|---|
| 5,024,090 A * | 6/1991 | Pettigrew et al. | 73/572 |
| 5,614,670 A | 3/1997 | Nazarian et al. | |
| 5,625,348 A | 4/1997 | Farnsworth et al. | |
| 5,724,241 A | 3/1998 | Wood et al. | |
| 5,983,701 A * | 11/1999 | Hassani et al. | 73/12.01 |
| 6,002,339 A | 12/1999 | Norris et al. | |
| 6,055,214 A | 4/2000 | Wilk | |
| 6,199,016 B1 | 3/2001 | Zuykov | |
| 6,317,384 B1 | 11/2001 | Luo et al. | |
| 6,459,654 B1 | 10/2002 | Bary et al. | |
| 2001/0020218 A1 | 9/2001 | Cosma | |

FOREIGN PATENT DOCUMENTS

| | | |
|---|---|---|
| EP | 0 967 494 A2 | 12/1999 |
| EP | 1 087 240 A1 | 3/2001 |
| WO | WO 00 / 50923 | 8/2000 |
| WO | WO 01 / 31364 | 5/2001 |

* cited by examiner

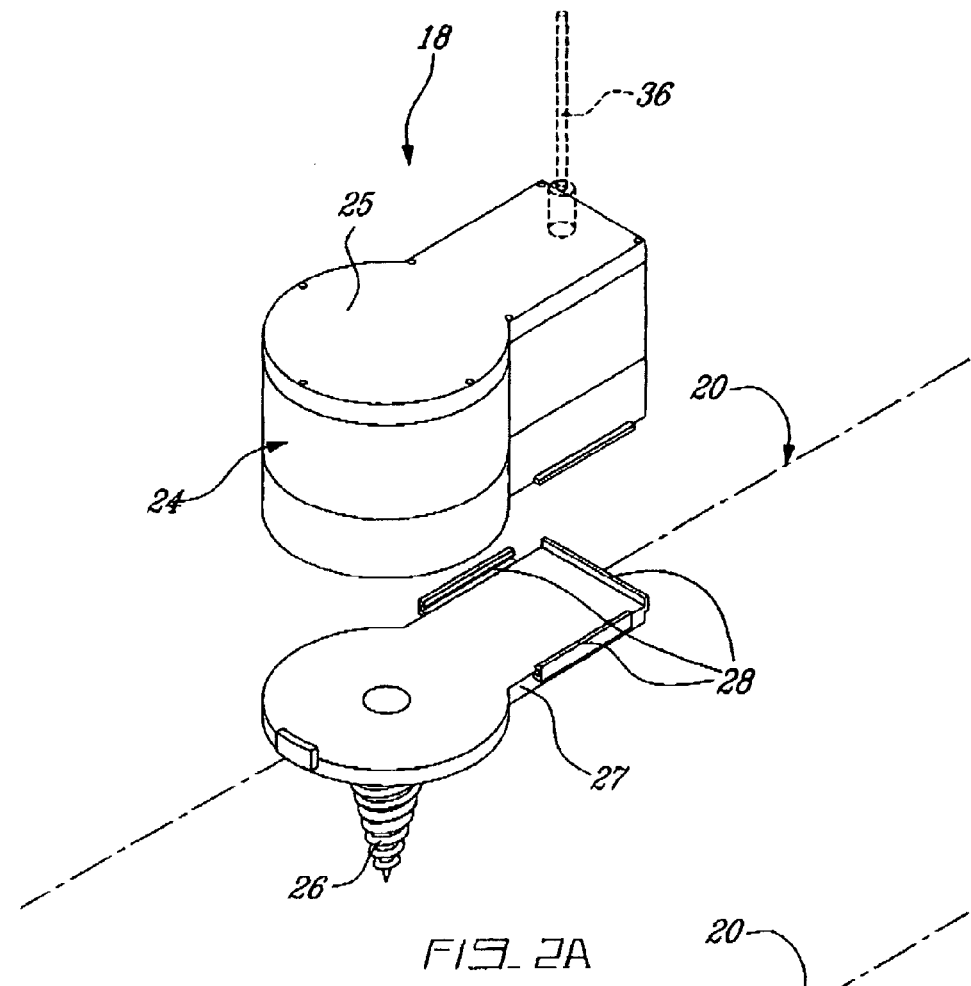
FIG_2A
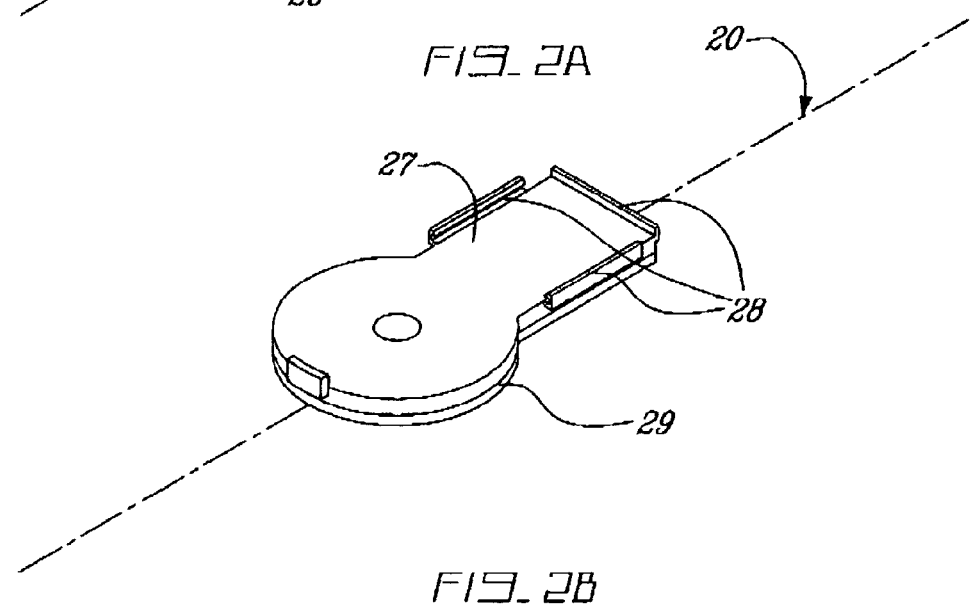
FIG_2B

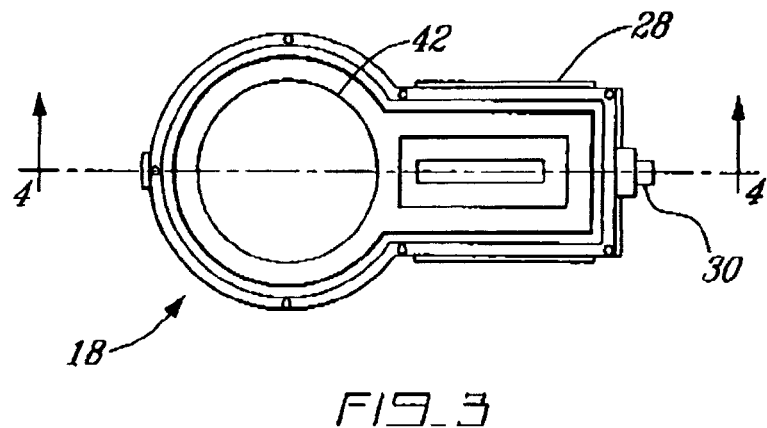
FIG_3
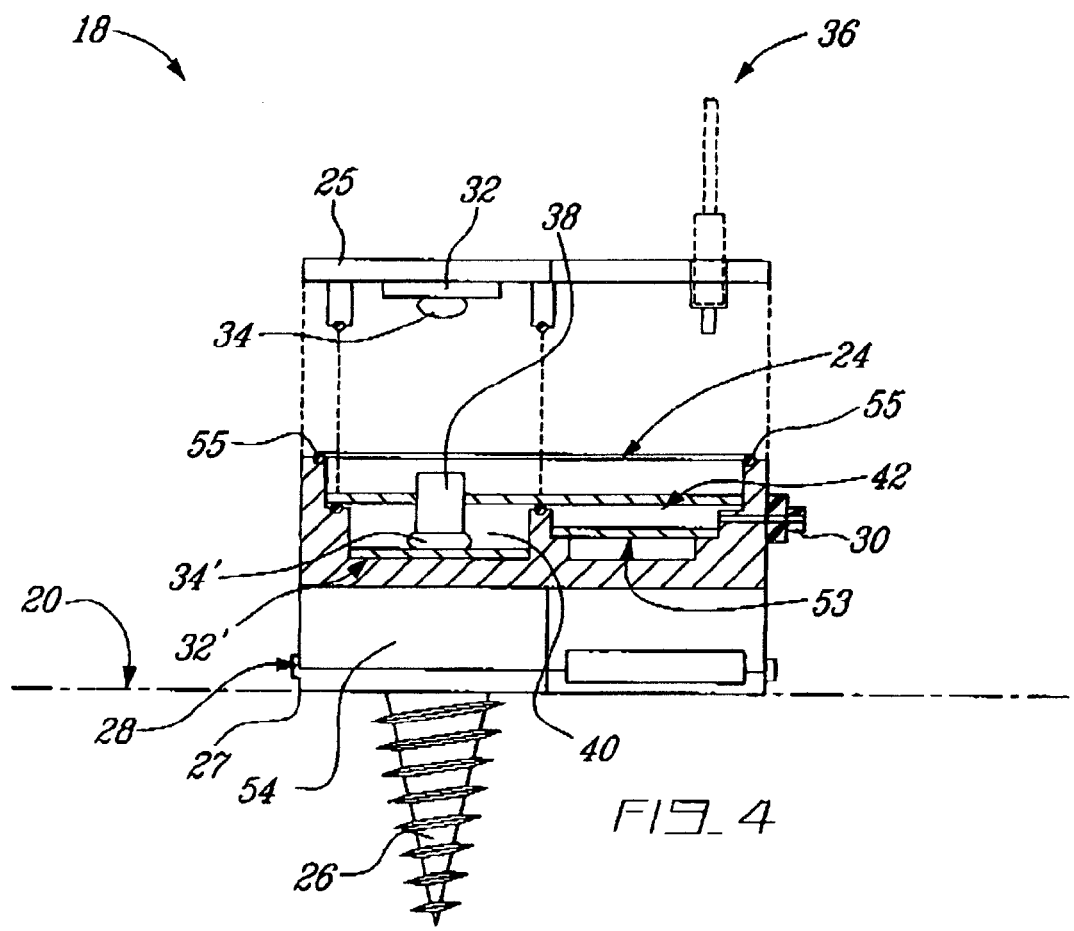
FIG_4

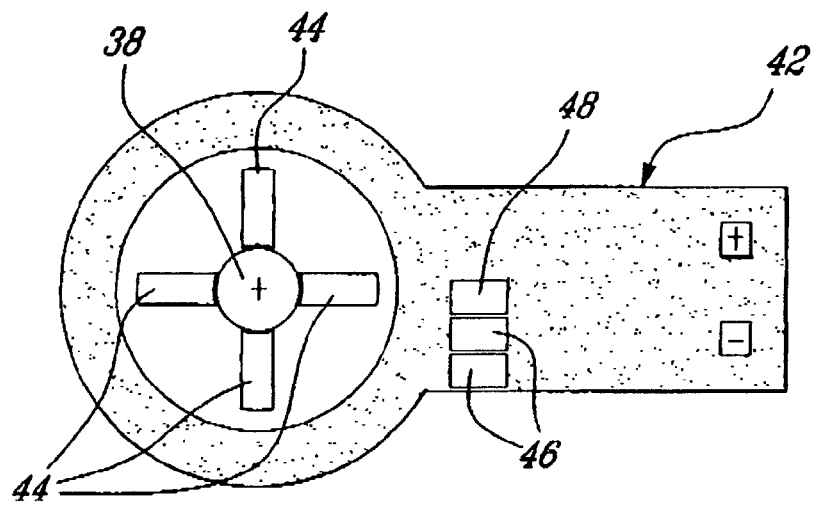
FIG_5
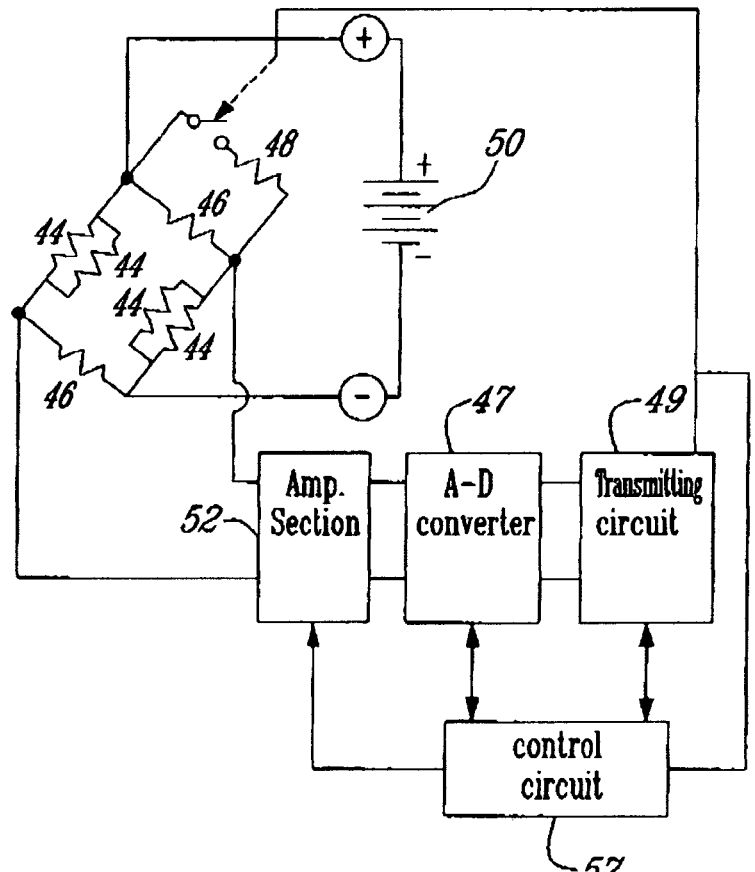
FIG_6

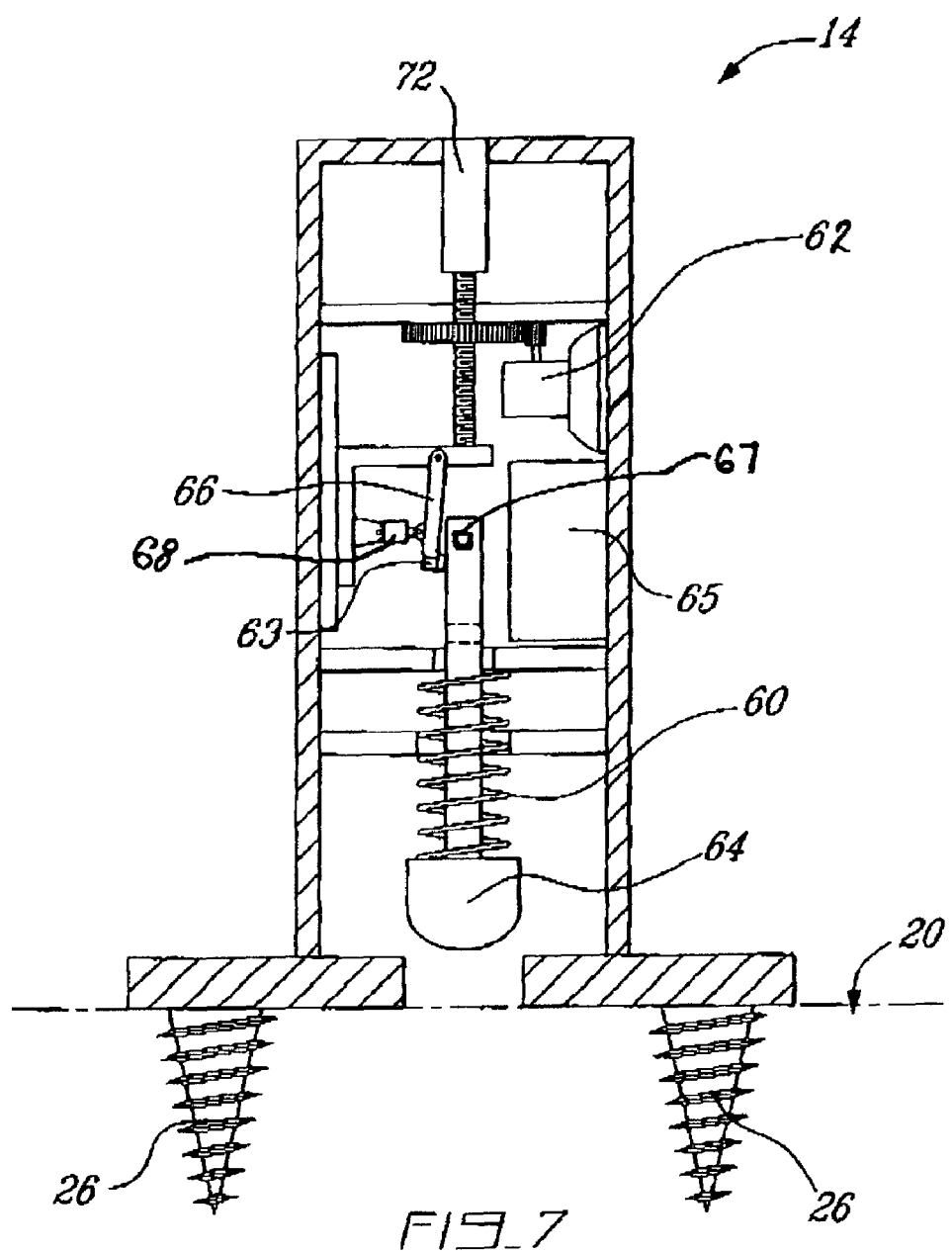
FIG_7

PROFILING SYSTEM

CROSS-REFERENCE TO RELATED APPLICATIONS

This application claims the benefit of priority under 35 U.S.C § 119 from Canadian Patent Application No. 2,366,030 filed on Dec. 20, 2001, the disclosure of which is incorporated by reference as if set forth in full in this document.

FIELD OF THE INVENTION

The present invention relates to the field of non-intrusive testing of a medium located under a surface. More specifically, the present invention is concerned with an intelligent profiling system permitting the mechanical characterization of a medium under a surface.

BACKGROUND OF THE INVENTION

In the field of geophysical exploration for example, non-intrusive techniques have been sought and developed as a supplement or an alternative to conventional in-situ testing techniques involving boring because these techniques are non-destructive. In some cases where boring is not feasible, for example in granular soils, such non-intrusive techniques are the only way to explore the underground. Also, they generally are more cost-effective.

Non-intrusive techniques are also used for exploring a medium situated under a surface in various other fields, for example, for assessing the wear conditions of roads, of bridges, of bar joints in buildings, of concrete walls, etc, or for detecting subsurface pockets in mining or military applications.

Interestingly, surface waves, and especially Rayleigh waves, are very useful in the field of non-intrusive testing. One of the well known method in the art is Spectral Analysis of Surface Wave ("SASW"), for instance, which makes use of surface waves for determining shear velocity profiles of the underground without intrusion. This method involves a pair of sensors, at least one source of impulses, and a signal processing system.

Although such a technique using surface waves permits exploration of a broad range of thickness of soils, by changing the distance between the two sensors and by using different sources of impulses, in the case of SASW discussed hereinabove for instance, its operation generally requires actions from a highly skilled worker expert in the field in order to obtain useful information on the subsurface medium under investigation.

Therefore, in spite of the efforts in the field, there is still a need for a system allowing profiling of a medium under a surface, comprising sensors, a generator of impulses and a user-computing interface, and permitting collecting, analyzing, and processing the data for display and use by a non-expert.

OBJECTS OF THE INVENTION

An object of the present invention is therefore to provide an improved profiling system.

SUMMARY OF THE INVENTION

In one of its embodiments, the present invention comprises a profiling system for obtaining a characterization of a medium under a surface. The profiling system comprising a plurality of system components exchanging messages through a communication interface. The system components comprise an energy impulse generator, a sensing assembly, and a user-computing interface. The generator, for transferring an energy pulse to the surface, comprises generator communication means for exchanging the messages with other system components. The sensing assembly includes sensors. Each one of the sensors comprises an accelerometer for detecting an acceleration on the surface resulting from the energy pulse and producing a signal representative of the acceleration. Each one of the sensors also comprises an interface communication means for transmitting the signal representative of the acceleration and exchanging messages with other system components through the communication interface. The user-computing interface comprises interface communication means for receiving the signal representative of the acceleration and exchanging messages with other system components through the communication interface. The user-computing interface also comprises an interface processor for processing the received signal representative of the acceleration to produce the characterization of the medium under the surface.

BRIEF DESCRIPTION OF THE DRAWINGS

In the appended drawings:

FIG. 2 is a perspective view of a displacement sensor used in the profiling system of FIG. 1;

FIG. 3 is a top plan view of the displacement sensor of FIG. 2;

FIG. 4 is a sectional view taken along the line 4—4 of FIG. 3;

FIG. 5 is a top view of the substrate of the displacement sensor of FIG. 2;

FIG. 6 is a diagram of a circuit equivalent to the displacement sensor of FIG. 5;

FIG. 7 is a schematic sectional view of an energy impulsion generator used in the profiling system of FIG. 1.

DESCRIPTION OF THE PREFERRED EMBODIMENT

Generally stated, the system of the present invention enables a non-intrusive physical analysis of mechanical characteristics of a medium located under a surface, and a display of the results thereof.

Such a medium separated from direct exploration by a surface can be the underground, the thickness of a concrete wall, the thickness of a joint bar and the like. For illustration purposes, the present invention will be described using an embodiment dealing with geophysical testing. Therefore, in the following, the medium to be studied is a subsurface region of the underground, through the surface thereof.

More precisely, the system of the present invention makes use of sensors that detect the velocity of shear waves induced in the subsurface region under test by means of an excitation generated by a generator of impulses.

Figure 1:
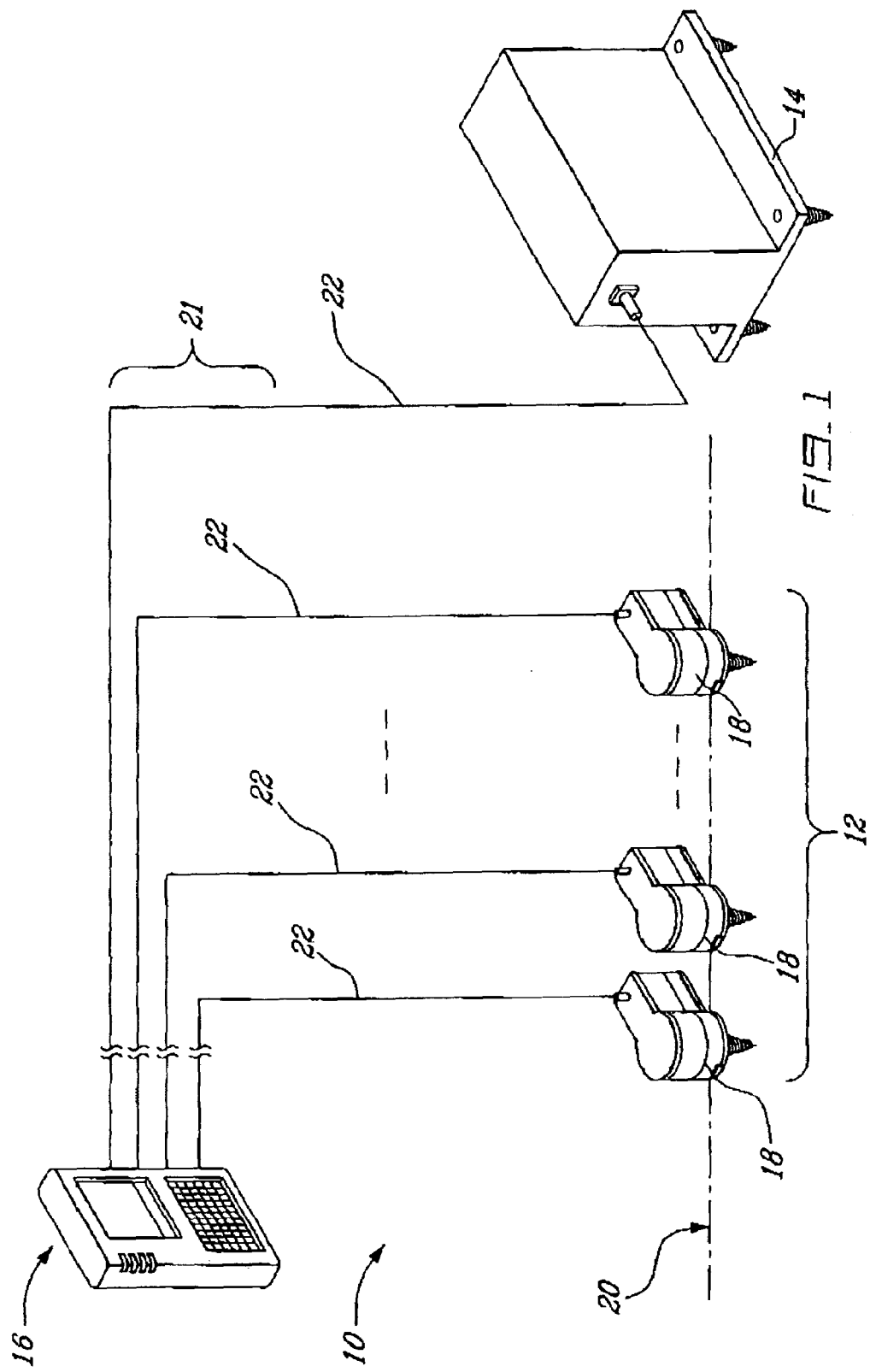
FIG. 1 is a schematic representation of a profiling system according to an embodiment of the present invention.

Turning now to FIG. 1 of the appended drawings, the system according to an embodiment of the present invention will be described.

Basically speaking, the system 10 comprises three units or system components: a sensing assembly 12; an energy impulse generator 14, (referred to in the following as EIG); and a user-computing interface 16, (referred to in the following as UCI).

As can be seen in FIG. 1, the sensing assembly 12 comprises displacement sensors 18 placed at various locations on a surface 20. The sensing assembly 12 may comprise a number of sensors 18 comprised between one sensor 18, which is located successively at various locations, and a plurality of sensors 18. In a specific embodiment of a system 10 according to the present invention, the sensing assembly 12 comprises four sensors 18. Obviously, other sensor quantities are possible as well. The role of the sensors 18 is to detect a movement in response to bursts of impacts generated by the energy impulse generator 14 on the surface 20.

Each one of the displacement sensors 18 of the sensing assembly 12, and the energy impulse generator 14, are connected to the user-computing interface 16 by means of an communication interface 21. Many different techniques may be used to interconnect the sensors 18 to the user-computing interface 16. For example, the communication interface 21 may include fiber optics cables, coaxial cables, multi-conductor cables, an optical link, a RF link, shown in FIG. 1 under label 22. Alternatively, multiplexing means may be considered for the interface of communication 21. Communication interface 21 is used to relay messages, comprising instructions and/or data, between system components.

As displayed in FIGS. 2 to 4, the sensor 18 is protected within a housing. The housing may include a plate 27 and a casing 24 closed by a top cover 25. Provided the surface 20 is not too hard, the displacement sensor 18 is attached to the surface 20 by means of a thread attachment 26 mounted on a plate 27 on which the casing 24 can be inserted and secured by edges 28 of the plate 27 (see FIG. 2a). Alternatively, in the case where the surface 20 is too hard, the plate 27 can be fixed thereto by means of an adhesive 29 (see FIG. 2b), or even simply deposited on the surface 20.

The casing 24 is provided with a communication connector 30 (see FIG. 3) for connection to the user-computing interface 16 by means of a connection 22 of the interface of communication 21 (see FIG. 1).

It is to be noted that the top cover 25 also supports a shock absorbing element 32 and a damping element 34, which are symmetrically located relative to a shock absorbing element 32' and a damping element 34' attached to the casing 24, and may support an optional communication antenna 36 or an optical diffuser (not shown).

A semiconductor substrate 42 is protected within the casing 24, as shown in the cross section of FIG. 4. A mass 38 is supported within an opening 40 of the semiconductor substrate 42 supporting strain gauges 44 and resistors 46 and 48 (shown in FIG. 5). The mass 38 is allowed to move in response to acceleration. As will easily be understood by one skilled in the art, movement of the mass 38 induced by shear waves generated in the subsurface region under surface 20 cause strains on the semiconductor substrate 42.

A person skilled in the art will understand that the semiconductor substrate 42 and the elements which it supports (mass 38, strain gauges 44, resistors 46, etc.) may be broadly referred to as an accelerometer or an accelerometer assembly or unit. An accelerometer may be broadly defined as a device whose response is linearly proportional to the acceleration of the material (e.g., in this case, a surface) with which it is in contact. A person skilled in the art will understand that the accelerometer or sensor 18 need not be in direct contact with the surface. Contact via other intermediary elements or media is also considered.

As shown in FIG. 6, the circuit equivalent to the displacement sensor 18 comprises four strain gauges 44 and two resistors 46 forming a Wheatstone bridge. One diagonal of the bridge is connected to a DC voltage source 50, while the other diagonal of the bridge serves as an output of the strain sensitive circuit and is connected to an amplification unit 52. As will be explained hereinbelow, the strain gauges 44 are used as transducers for transforming a mechanical deformation on the semiconductor substrate 42 into an electric signal (or other type of information bearing signal). The resistor 48 is used for calibration purposes, as will be described hereinbelow.

The strain gauges 44 are used to record the movement of the subsurface region under test, transmitted to the displacement sensor 18 by the mass 38. They are temperature-compensated by means of the matched resistors 46. It is to be noted that the high symmetry of the sensing circuit of FIG. 5 also contributes to the temperature compensation by allowing balancing of the Wheatstone bridge over a range of temperature.

The strain gauges 44 can be glued on top of the semiconductor substrate 42, built up by deposit onto substrate 42, directly etched thereto. The direct etching of the semiconductor substrate 42, by techniques known in the art, ensures a perfect location of the strain gauges 44 together with a minimized temperature mismatch, therefore a minimized stress concentration, thus enabling the manufacture of a highly sensitive displacement sensor 18.

The displacement sensor 18 further comprises an interface board 53 (also referred to herein as an interface unit), shown in FIG. 4, which supports the required communication circuitry attached to the communication connector 30 and/or antenna 36. One of the communication circuitry functions is to modulate the signal representative of the surface acceleration (obtained from, for example, the Wheatstone bridge). The modulation includes any transformation of a signal to prepare for transmission over the communication interface 21. As seen in FIG. 6, displacement sensor 18 may further include an analog to digital converter 47, a transmitting circuit 49 (also referred to as sensor communication means) and a control circuit 57. The control circuit 57 is used for power management, to adjust the level of amplification of the amplification unit 52 and its offset, during calibration to a prefixed value. Frequency filtering means (not shown), compensation and linearization means (not shown) may be added on substrate 42 to alter the electrical signal from the Wheatstone bridge. In an embodiment of the invention, substrate 42 also includes memory means and processor (neither are shown in FIGS. 2–6). The control circuit 57 also allows setting the dynamic range of the analog to digital converter 47.

Of course, the type of circuitry depends in part on the type of communication 22 of the interface of communication 21 between the displacement sensors 18 and the user-computing interface 16.

The displacement sensor 18 can either be externally powered or internally powered by means of an integrated power source 54 such as batteries located underneath the semiconductor substrate 42 (see FIG. 4). Such batteries can be located inside the casing wherever convenient, or even in an extra casing outside the casing 24. In another embodiment of the invention, sensor 18 may be powered externally by radio-frequency signals.

As explained hereinabove in relation to FIGS. 2a and 2b, each displacement sensor 18 may be simply deposited on the surface 20, or secured thereto by means of an adhesive 29 (FIG. 2b), or fastened thereto by means of a thread attachment 26 (FIG. 2a).

The damping element 34 attached to the top cover 25, and the corresponding damping element 34' attached to the casing 24, may be made of elastic or gel-like material. By ensuring a constant absorption of energy over a range of temperature, and provided they are made of a material having resistance to fatigue such as neoprene or silicone for example, they optimize the damping factor and contribute in maximizing the quality of the signal.

Indeed, the performance of the displacement sensor 18, as assessed in terms of amplitude and phase distortion, depends primarily on the magnification factor and the damping factor of the device.

The shock absorbing pads 32 and 32' are efficient in protecting the displacement sensor 18 from excessive shock, for example during handling.

Thermoplastic, elastic, sealing product or rubber joints 55 are provided between the cover 25 and the casing 24 for sealing the displacement sensor 18 and protection against adverse environment (see FIG. 4).

It is to be pointed out that the fact that the displacement sensor 18 of the present invention comprises a semiconductor substrate 42 that has integrated strain gauges 44, amplification means 52 and control circuitry 57, permits reducing the noise to signal ratio and therefore the contamination of the signal during transmission to the UIC 16. The possibility for the displacement sensor 18 to include an analog to digital inverter 47 in case one such item is needed also contributes to the reduction of the noise to signal ratio during transmission.

Furthermore, people in the art will be aware that the use of semiconductor strain gauges 44 enables achieving a gain superior to that obtained by using conventional foil strain gauges.

It is also to be underlined that the use of a mass 38 contributes to increase the responsiveness, and therefore, the measurement capability, of the strain gauges assembly.

As is generally known in the art, the displacement sensor 18 according to the present disclosure operates as follows: when power is fed to the circuit in absence of acceleration, the substrate 42 is not strained and the resistance of the strain gauges 44 is maintained at its original level so that the output signal of the circuit is zero. As an acceleration occurs, an external force is applied on the mass 38, which causes deformation of the substrate 42 resulting in a change of the electric resistance values of the resistance elements since the substrate 42 bends and deforms the gauges 44. This deformation changes the nominal resistance of the gauges 44, causing the equilibrium conditions of the Wheatstone bridge to be broken, giving rise to a voltage output of the circuit. One skilled in the art will understand that analysis of this output voltage enables to obtain the characteristics of the subsurface region under test.

Turning to FIG. 7 of the appended drawings, the energy impulse generator 14 will now be described.

The energy impulse generator 14 comprises a spring 60 that is set into compression by a motor assembly 62 so as to store energy and to pull on an impact head assembly 64 through a latch 66. The impact head assembly 64 is released by activating a solenoid 68 that pulls the latch 66, thus unlocking the impact head assembly 64, allowing the extension of the spring 60.

Obviously, the power source for the spring 60, here exemplified as the motor assembly 62, could be a pneumatic, a hydraulic, electrical or a mechanical source.

The spring 60 is used against the inertia of the impact head assembly 64 and gives impulsion at the time of an impact, and also as a means for holding back the impact head assembly 64 so as to prevent it from bouncing back after an impact.

A strain gauge circuitry 63 (also referred to more broadly as a strain measuring device), located on latch 66 for example or an accelerometer 67 located impact head assembly 64, is used to monitor the energy, which is stored into the spring 60, by comparing it with the energy command transmitted by the UCI 16 to the EIG 14 control circuit.

A damper 72 is provided to absorb the shock produced on the assembly, while the energy impulse generator 14 thus transmits a burst of energy by the impact of the impact head assembly 64 on an element to be analyzed.

A control circuit (not shown) permits to monitor the amount of energy release and the overall operation of the EIG 14. EIG 14 may also include other circuitry (not shown) such as a processor which operates and manages EIG 14; and memory means. Memory means includes various types of memory such as Random Access Memory (RAM), Read-Only Memory (ROM), Electrically Erasable Programmable ROM (EEPROM), etc. RAM is used during calculations, for data storage, and for timestamp recording (from the processor 84 or a sensor unit and to be transmitted or relayed). ROM comprises initialization codes, start sequences, etc. EEPROM may comprise operation algorithms, tables, sensor identification, etc. EEPROM data may be received via communication interface 21.

A power pack 65 is provided for holding a battery. It also adds weight to the overall structure of the EIG 14. Power pack 65 may include rechargeable batteries. The batteries may be recharged in a contact or contact-free (e.g., via RF) fashion. Power supply through direct cable feed is also an option.

The EIG 14 is fastened to the surface 20 using threaded attachment 26 or other attachment means essentially similar to those used for the displacement sensor 18 and described hereinabove. Other examples of attachment means include a weight, magnetic material, adhesive material, a "Ramset" or explosive driven type anchoring means, etc. It is understood that these types of attachment means can be used for sensor 18 as well.

The energy for activating the above described process of impact generation is released by means of a command issued from the user computing interface 16 (UCI) and transmitted to the EIG 14 through a cable, an optical signal or a radio frequency signal. This command triggers the loading and unloading of the mechanism and thus the delivery of an energy pulse by the EIG 14.

The user-computing interface (UCI) 16, exemplified in FIG. 1, comprises a number of subsystems: a user interface system, comprising a keyboard, power and function keys, a display screen and/or a touch screen and/or a voice recognition device; an equipment interface, which allows connection to other output devices such as printers (not shown); an interface system with the IEG; a signal collecting system for collecting data from the displacement sensors 18 of the sensing assembly 12; a processing system, which performs the computations and manages the various interfaces together; and a computer interface system that permits connection to other computers.

Of course, the UCI 16 stores a program or algorithm that, for example, can control the energy impulse generator 14 and the displacement sensors 18, and collects and stores data from the displacement sensors 18 of the sensing assembly 12. Furthermore, this program may analyze the collected data to calculate some properties or features of the medium under a surface and display them.

It is to be noticed that each one of the different assemblies can operate in an autonomous fashion, or powered by a central unit.

Most interestingly, provided the program and software stored in the UCI 16 is adequate, the system of the present invention can be used in a variety of applications.

For example, in the field of geotechnical testing, the system of the present invention can be used to detect pockets or faults in the underground, in the mining industry. As a further example, in the military field, the system of the present invention can be used in order to study the geological structure of a terrain for the purpose of effective explosive positioning or hideouts uncovering. The present system could be used to supply data to systems such as the so-called JTIDS ("Joint Tactical Information Distribution System").

Additionally, people, in the art will foresee the possibility of adding GPS or gyroscope systems to locate each displacement sensor 18 of the sensing assembly 12, and the EIG 14. One possible application is related to the identification of an underground cavity and the determination of its spatial coordinates. An algorithm can be introduced into the UCI 16 that maps, through the use of a global positioning system (GPS), volumes that can be used for underground concealed hideouts, facilities, etc. In military applications in particular, such an algorithm may also be able to detect any structural fault so as to allow planning accordingly strategic delivery of payload in order to maximize the damage to cavities or underground-concealed areas.

Another field of possible applications where the system 10 of the present invention can be used, providing the adequate algorithm is included into the UCI 16, is the communication field, taking advantage of the property of low frequency shear waves to propagate over long distances or great depths. Such a specific user-computing interface 16 may perform unidirectional or bi-directional communication, detect, identify and locate movements on the ground surface. In this kind of application, the system 10 uses as a transmitter an electromechanical device that induces energy at various frequencies in the ground, resulting in ground waves. As low frequency shear waves propagate deep into the ground and over long distances, while high frequency waves can travel only short distances, a communication signal consists of an energy signature modulated in frequency and relative amplitude that initiates, delivers, and ends a predetermined communication protocol. Due to various reflections caused by the complex geophysical environment, the transmitted signal is scrambled in time and frequency domain during its way therethrough. The sensing assembly 12, used at the receiving end, in conjunction with the UCI 16, unscrambles this signal so as to reconstruct the frequency domain and its variation over time. The high frequency content thereof is used as a means to securely position the source of the signal.

Additionally, the distribution of displacement sensors 18 enables position triangulation of an emitter or of any signal sources generated by troops, moving vehicles or impacts on the ground. Reconstructing incoming signals, the UCI 16 may process pattern recognition database to match signatures and identify an emitting source.

Figure 8:
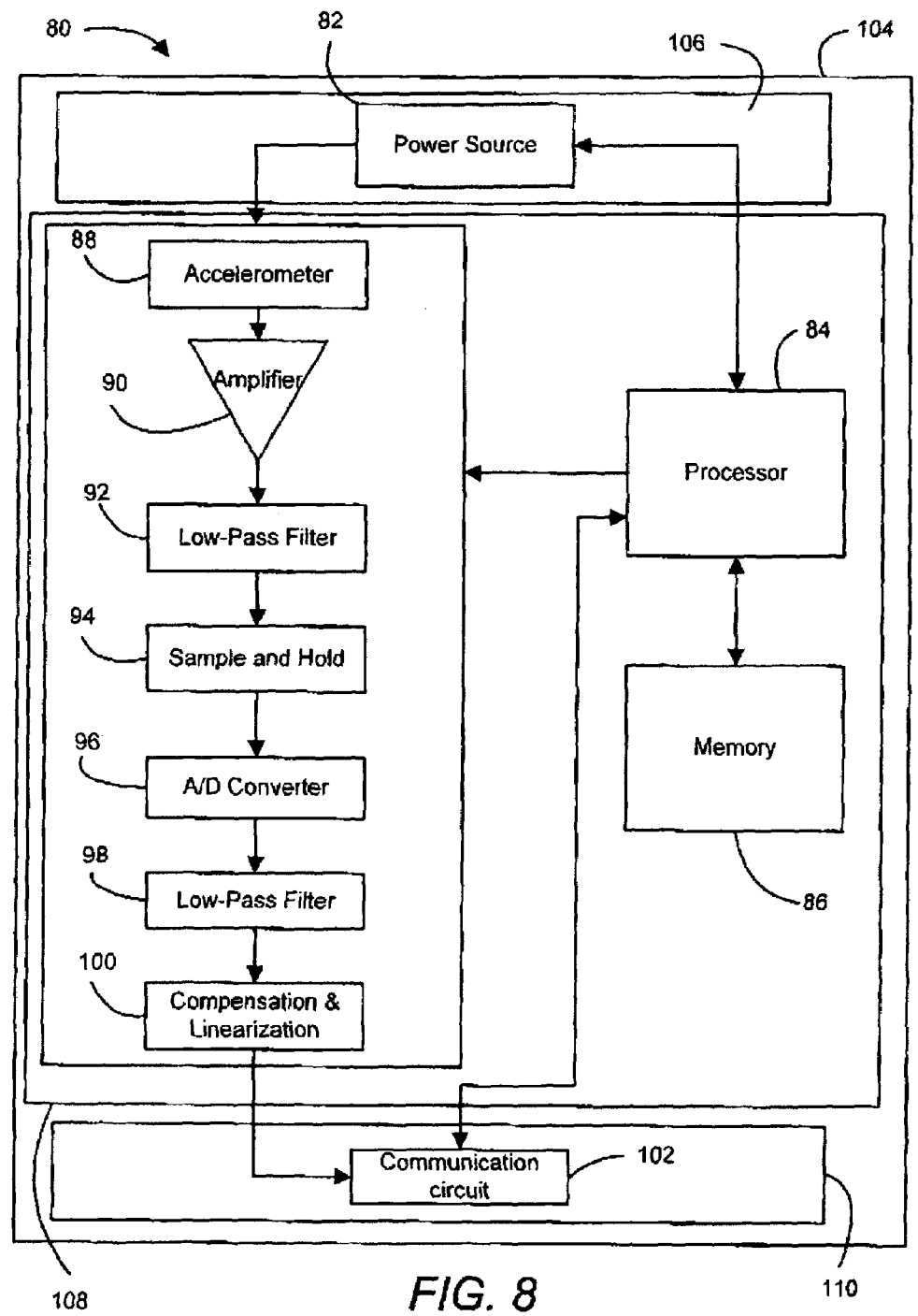
FIG. 8 is a block diagram of a sensor in accordance with another embodiment of the invention.

A sensor 80 is shown in FIG. 8 in accordance with another embodiment of the invention. Sensor 80 comprises an accelerometer 88 whose response is in relation to the acceleration of the surface 20 with which sensor 80 is in contact. Accelerometer 88 may comprise strain gauges, capacitors, or piezo-electrical devices. Accelerometer 88 can therefore be conventional type accelerometers, but other technologies such as Micro Electro Mechanical Systems (MEMS) or Nano Electrical Mechanical Systems (NEMS).

The signal (electrical or other equivalent message carrying type of signal) representative of the acceleration produced by accelerometer 88 is fed to amplifier 90. In an exemplary embodiment, amplifier 90 is an automatic gain amplifier. Amplifier 90 may therefore act to increase the dynamic range of sensor 80. The gain of amplifier 90 is transmitted to processor 84 which will in turn the signal sent by RF communication circuit 102.

After amplifier 90, the signal is sent to a low-pass filter 92. Low-pass filter 92 eliminates spectral aliasing in the frequency domain and distortion in the time domain. Sample and hold device 94 then receives the signal, samples it and holds it for a period of time sufficient for analog to digital converter 96 to perform its conversion of the analog signal to a digital signal.

A person skilled in the art will understand that one can add a second set of accelerometer (not shown), amplifier (not shown) and low-pass filter (not shown) in parallel to the first set heretofore described and feed sample and hold device 94. Sensor 80 described above acts as a simple accelerometer. With a second accelerometer placed so as to pick up acceleration in an axis which is perpendicular to the axis of the accelerometer 88, sensor 80 becomes an inclinometer. In yet another embodiment of the invention, sensor 80 may comprise a third set of accelerometer (not shown), amplifier (not shown) and low-pass filter (not shown) in parallel to the first and second sets heretofore described and feed sample and hold device 94. With a third accelerometer placed so as to pick up acceleration in an axis which is perpendicular to the axis of both accelerometer 88 and the second accelerometer, sensor 80 becomes a gyroscope.

Persons skilled in the art will understand that one may calculate speed from of the integral over time performed the signal representative of the acceleration output by accelerometer 88. One may also calculate distance by integrating speed over time. These calculations may take place in processor 84.

Returning to the embodiment shown in FIG. 8, the signal from analog to digital converter 96 is sent to low-pass filter 98 which will remove undesired frequencies. Low-pass filter 98 may also be incorporated within analog to digital converter 96. In order to remove any distortions (in amplitude or phase) the signal is then compensated and linearized in compensation and linearization device 100. The compensation and linearization device 100 will linearize the signal in order to guarantee a uniform performance in regards of the frequency component, and linearization device 100 will also spread the frequency spectrum of the signal.

The signal is finally sent to communication circuit 102. Communication circuit 102 send and receives messages comprising instructions and/or data through a communication interface 21 to a UCI 16 or to other sensors 80 (not shown) in a sensing assembly similar to sensing assembly 12. Typical instructions include; reset; initialization; download; new algorithms; linearization, compensation and identification parameters (transmit or download); calibration; transmission mode (e.g., direct, network); start of sampling; energy conservation; etc. In network mode, a communication protocol will establish the best path for transferring data from sensor to sensor and finally to UCI 16. Sensor 80 may therefore act as a data relay. Communication circuit 102 may be protected against electromagnetic interference. In an embodiment of the invention, each sensor 80 has its own Internet Protocol (IP) address and is addressed accordingly.

Sensor 80 also comprises a processor 84 which operates and performs management of sensor 80. Sensor 80 comprises memory means 86. Memory means 86 includes various types of memory such as Random Access Memory (RAM), Read-Only Memory (ROM), Electrically Erasable Programmable ROM (EEPROM), etc. RAM is used during calculations, for data storage, and for timestamp recording (from processor 84 or another sensor 80 and to be transmitted or relayed). ROM comprises initialization codes, start sequences, etc. EEPROM may comprise operation algorithms, tables, sensor identification, etc. EEPROM data may be received via communication interface 21.

Power to sensor 80 is provided by power source 82. Power source 82 may include rechargeable batteries. The batteries may be recharged in a contact or contact-free (e.g., via RF) fashion. Power supply through direct cable feed is also an option.

Optionally, sensor 80 may also include a positioning circuit (not shown) such as an electronic gyroscope or a Global Positioning System (GPS) receiver.

In an embodiment of the invention, a housing 104 comprises three sections. Housing 104 is hermetically sealed to protect all of its components from external elements. A first section 106 holds the batteries and power regulation circuitry. A second section 108 holds items 84 to 100 as well as the positioning circuit (not shown). A third section 110 holds communication circuit 102. Surface of section 110 is conductive thereby providing an electromagnetic barrier to protect communication circuit 102 from electromagnetic interference (EMI).

Although the present invention has been described hereinabove by way of preferred embodiments thereof, it can be modified, without departing from the spirit and nature of the subject invention as defined in the appended claims.

The invention claimed is:

1. A profiling system for obtaining a characterization of a medium under a surface, said profiling system comprising a plurality of system components exchanging messages through a communication interface, said system components comprising:
   a. an energy impulse generator for transferring an energy pulse to said surface and comprising generator communication means for exchanging said messages with other system components;
   b. a sensing assembly including sensors, each one of said sensors comprises an accelerometer for detecting an acceleration on said surface resulting from said energy pulse and producing a signal representative of said acceleration, each one of said sensors comprises an interface communication means for transmitting said signal representative of said acceleration and exchanging said messages with other system components through said communication interface; and
   c. a user-computing interface comprising interface communication means for receiving said signal representative of said acceleration and exchanging said messages with other system components through said communication interface, and an interface processor for processing said received signal representative of said acceleration to produce said characterization of said medium under said surface.

2. The profiling system of claim 1, wherein each one of said system components comprises a processor for producing messages and wherein said generator communication means, said interface communication means of said sensing assembly and said interface communication means of said user-computing interface are capable of relaying said messages directly from each one of said sensors and said impulse generator to said user-computing interface and vice versa.

3. The profiling system of claim 1, wherein each one of said system components comprises a processor for producing messages and wherein said generator communication means, said interface communication means of said sensing assembly and said interlace communication means of said user-computing interface are capable of relaying said messages to any other system component.

4. The profiling system of claim 3, wherein said generator communication means, said interface communication means of said sensing assembly and said interface communication means of said user-computing interface are capable of communicating with communication devices external said profiling system.

5. The profiling system of claim 4, wherein said generator communication means, said interface communication means of said sensing assembly and said interface communication means of said user-computing interface comprises at least one of an antenna, an optical transceiver, and a connector for connecting to a communication cable.

6. The profiling system of claim 5, wherein said user-computing interface comprises an interface processor for producing messages comprising at least one of instructions and data.

7. The profiling system of claim 6, wherein each one of said sensors comprises a sensor processor and said impulse generator comprises a generator processor, said sensor and generator processors for processing said messages from said user-computer interface.

8. The profiling system of claim 7, wherein each one of said system components comprises memory means respectively connected to the processor in the same one of said system components, said processor for storing said at least one of instructions and data.

9. The profiling system of claim 8, wherein said data comprises a unique system component identifier.

10. The profiling system of claim 9, wherein each one of said system components comprises an electrical power source.

11. The profiling system of claim 10, wherein each one of said system components further comprises a positioning circuit respectively connected to the processor in the same one of said system components.

12. The profiling system of claim 11, wherein said positioning circuit comprises at least one of a gyroscope and a Global Positioning System.

13. The profiling system of claim 1, wherein said user-computer interface further comprises a display for displaying said characterization of said medium under said surface.

14. The profiling system of claim 13, wherein said user-computer interlace further comprises user input means for receiving instructions from a user.

15. The profiling system of claim 14, wherein said input means comprises at least one of a keyboard, a mouse, a touch screen, and a voice-recognition device.

* * * * *